United States Patent [19]
Chisum

[11] 3,841,509
[45] Oct. 15, 1974

[54] APPARATUS FOR TRANSPORTING ONE VEHICLE BY ANOTHER

[76] Inventor: Finis Lavell Chisum, Rt. 5, Woodcrest Height, Claremore, Okla. 74017

[22] Filed: Feb. 28, 1973

[21] Appl. No.: 336,869

[52] U.S. Cl. ............... 214/506, 280/80 B, 280/407, 296/1 A
[51] Int. Cl. .............................................. B60p 1/28
[58] Field of Search ............ 296/1 A, 10; 280/80 B, 280/438, 43, 33.99 T; 214/85, 506

[56] References Cited
UNITED STATES PATENTS

| | | | |
|---|---|---|---|
| 2,009,654 | 7/1935 | Fleet | 296/1 A |
| 3,048,437 | 8/1962 | Linder | 296/1 A |
| 3,097,012 | 7/1963 | Bain | 296/10 |
| 3,235,285 | 2/1966 | Tenenbaum | 280/43 |

*Primary Examiner*—David Schonberg
*Assistant Examiner*—John A. Pekar
*Attorney, Agent, or Firm*—Dunlap, Laney, Hessin, Dougherty & Codding

[57] ABSTRACT

The present invention relates to load carrying vehicles, and more particularly, but not by way of limitation, relates to a method for transporting one semitrailer and tractor combination upon a second semitrailer and tractor combination, and further relates to a novel semitrailer and tractor construction which can be transported in accordance with the method of the present invention.

8 Claims, 10 Drawing Figures

3,841,509

APPARATUS FOR TRANSPORTING ONE VEHICLE BY ANOTHER

As is well known in the trucking industry, in order to obtain maximum utilization and therefore maximum efficiency and profit from the operation of a fleet of trucks, it is necessary to have a pay load at all times. Thus on long trips, it is essential to carry one pay load during the out trip, and another pay load during the return trip. However, in practice the pay load during the return trip is seldom available and the truck must be returned to its base of operation empty. This situation is especially prevalent when hauling steel beams and the like on flat bed trucks from a fabrication mill, or in hauling wheat from out-lying elevators to a granary. Not only is the empty return trip uneconomical because of the use of fuel, but it also results in considerable wear on the vehicle. In this respect, it will be appreciated that the damage to the vehicle is compounded by the fact that the spring suspension system is designed to carry a heavy load. Therefore, when the truck is operated without a load, it is, for all practical purposes rigidly supported rather than spring supported, which results in severe vibrations and shocks, especially to the semitrailer. On trips of any substantial length, the driver usually must stay overnight and sleep before he is able to safely drive the return trip. This not only results in wasted operator time, but also greatly reduces the useable time of the truck.

In view of these fundamental difficulties in fully utilizing trucks, it has long been recognized that whenever the job is such as to require two trucks to carry a pay load to a destination, and there is no return load, it would be desirable to transport one truck by the other. Although this concept has occasionally been used to transport a smaller truck on a larger one, it heretofore has not been feasible because all trucks designed for long hauls are invariably constructed as large as possible and still remain within the maximum length, width and height limitations imposed by the laws of the several states. Consequently, all trucks are of approximately the same overall dimensions and one truck cannot normally be loaded onto the other in the absence of special equipment.

Therefore, it is an important object of the present invention to provide a novel vehicle construction and a novel method for loading the vehicle upon a similar vehicle for transport. Without intending to limit the present invention as defined by the appended claims, the method in accordance with the invention may more specifically be described as reducing the wheel base of a first semitrailer and tractor combination, lowering the forward end of a second semitrailer to the ground to form a ramp, driving the first semitrailer and tractor onto the second semitrailer with the first tractor at the rear end of the second semitrailer, raising the rear end of the first semitrailer, and loading the second semitrailer onto the second tractor. The rear end of the first semitrailer will then be raised sufficiently to extend over the cab of the second tractor. When the first semitrailer and tractor combination is secured on the second, the two are then ready for transport using but one driver and operating only one tractor.

It is also a very important object of the present invention to provide an improved semitrailer construction for use in accordance with the method of the present invention. In particular, without intending to limit the present invention, a semitrailer constructed in accordance with the present invention has an elongated load bed, a plurality of rear support wheels disposed adjacent the rear end thereof, an elongated track connected to the underside of the load bed adjacent the rear thereof and extending forwardly and sloping downwardly from the load bed, and means slidably connecting the rear support wheels to the elongated track for moving the wheels along the track, whereby the inclined track will raise the rear end of the load bed as the wheels are moved forwardly to shorten the wheel base of the semitrailer and tractor. The present invention further contemplates a novel lift mechanism for lowering the forward end of the second semitrailer to the ground and for raising the forward end after the semitrailer is loaded to a sufficient height to be coupled to the fifth wheel of a tractor, as well as several other more specific features which will presently be described in the specification and pointed out in the appended claims.

Many additional objects and advantages of the present invention will be evident to those skilled in the art from the following description and drawings, wherein:

FIG. 6 is an end view of the load bed of one of the semitrailers illustrated in FIG. 1, which is especially adapted to transport grain and other particular material;

FIG. 7 is a view similar to FIG. 6 showing the side boards and end gate of the semitrailer shown in FIG. 6 pivotally folded downwardly for transport in accordance with the method of the present invention;

Figures 1, 2, 3:
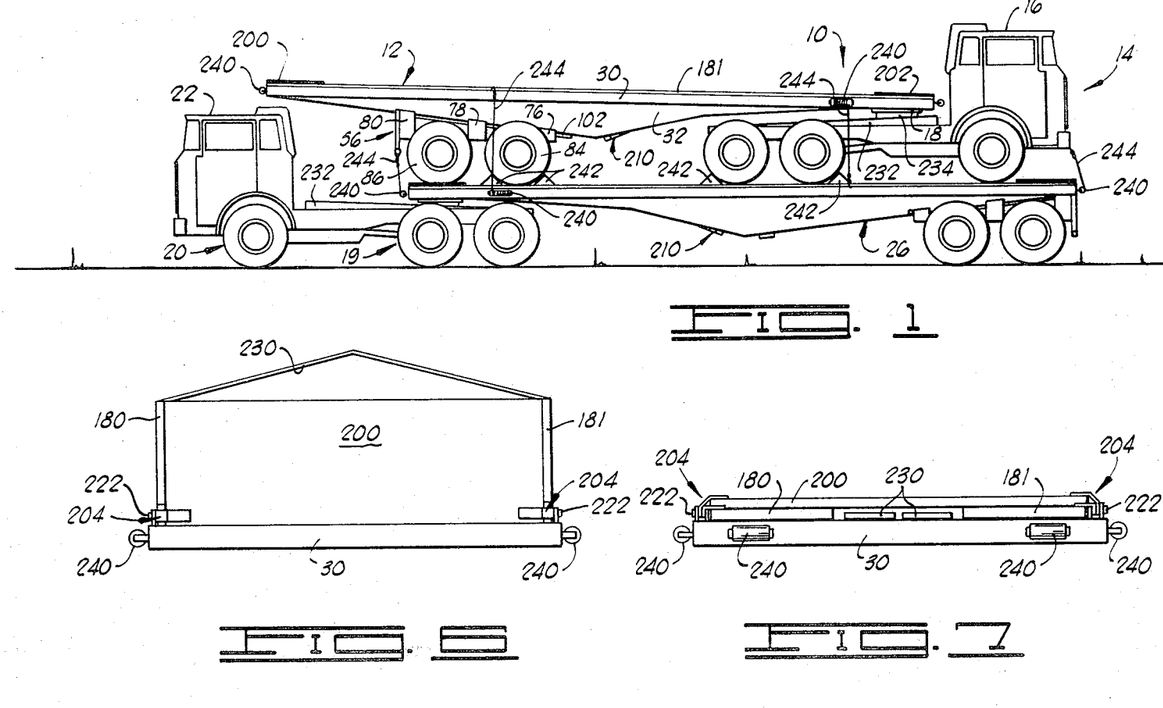
FIG. 1 is a side elevational view of a pair of similarly constructed semitrailers and tractors constructed in accordance with the present invention, and loaded one upon the other in accordance with the method of the present invention.
FIG. 2 is a longitudinal sectional view of the rear end of one of the semitrailers illustrated in FIG. 1.
FIG. 3 is a sectional view taken substantially on lines 3—3 of FIG. 2.
Figure 2:
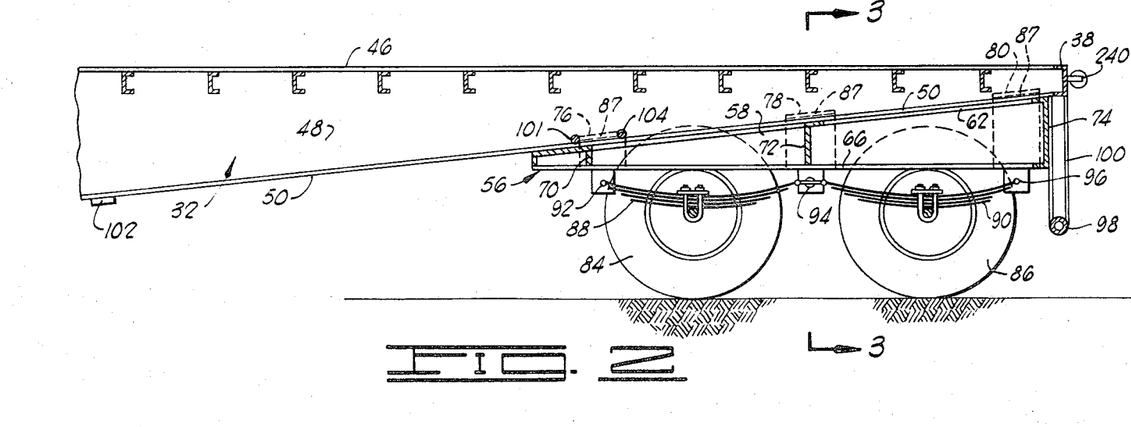

Referring now to the drawings, and in particular to FIG. 1, a first semitrailer and tractor combination is indicated generally by the reference numeral 10 and is comprised of a semitrailer 12 and a tractor 14. The tractor 14 has a sleeper type operator's cab 16 and a fifth wheel 18 which is slidably supported on a novel track extending longitudinally of the tractor chassis, as hereafter described in greater detail. A second semitrailer and tractor combination, indicated generally by the reference numeral 19, is comprised of a tractor 20 and a semitrailer 26, which may be of substantially identical construction to the semitrailer and tractor combination 10. The tractor 20 has a sleeper type operator's cab 22 and a fifth wheel 24 which may also be slidably mounted on a track on the tractor chassis, as will hereafter be described in greater detail, and the semitrailer 26 is connected to the tractor 20 by the fifth wheel 24. Since the first and second semitrailer and tractor combinations 10 and 19 are of identical construction, for convenience of discussion and illustration only the first semitrailer and tractor combination 10 will now be described in detail. Therefore, it is to be understood that the semitrailer and tractor combination 19 is similarly constructed and accordingly like parts are designated by like reference numerals. However, it is to be expressly understood that although the semitrailers are preferably of identical construction for maximum versatility, each of the semitrailers may be provided with only that portion of the total equipment to be hereafter described which is essential in the event it is desired to always load the first combination upon the second, which necessary equipment will hereafter be pointed out in greater detail.

The semitrailer 12 is comprised of an elongated load bed 30 fabricated in accordance with known techniques from a pair of longitudinally extending parallel I-beams 32 and 34 which extend the entire length of the load bed and are interconnected at the respective ends by a front channel 36 and a rear channel 38. The I-beams 32 and 34 have an outline substantially as shown by a composite of FIGS. 2 and 4, and are located somewhat centrally and spaced apart as best seen in the transverse sectional views of FIGS. 3 and 5. Side channel beams 40 and 42 interconnect the ends of transverse channel beams 44 which provide supports for plywood or other wooden decking 46 which covers the load bed. It will be noted that the beams 32 and 34 have web portions 48 and 49, respectively, (see FIG. 3), vertically disposed and are wider at the center of the load bed for greater strength. The beams 32 and 34 also have lower flanges 50 and 54 which are straight along the portions from the rear transverse channel 38 to the point 52 shown in FIG. 4. The straight portions of the lower flanges 50 and 54 adjacent the rear end of the semitrailer then form an elongated track means which extends forwardly from the rear end of the semitrailer and slopes downwardly with respect to the upper surface or decking 46 of the load bed 30.

Figures 3, 3A:
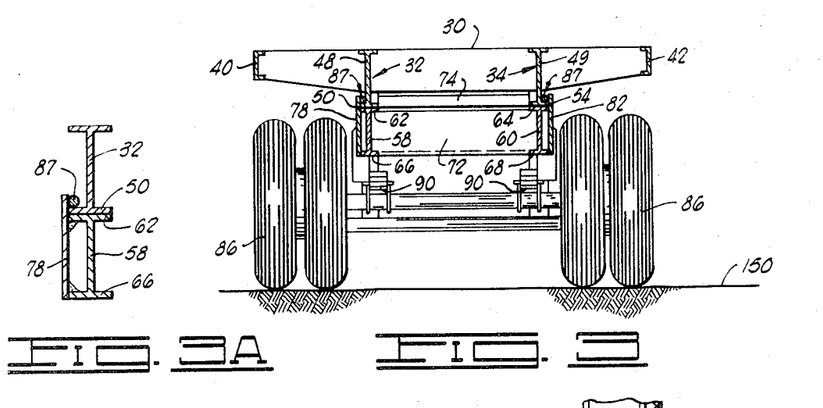
FIG. 3a is an enlarged sectional view for better illustrating the details of construction of a portion of the structure shown in FIG. 3.

A bogey wheel frame, indicated generally by the reference numeral 56, is comprised of a pair of I-beams 58 and 60, as best seen in FIG. 3. The I-beams 58 and 60 are wedge-shaped, as best seen in FIG. 2, and have upper flange portions 62 and 64, respectively, which engage the lower flanges 50 and 54 of the longitudinal I-beams 32 and 34, respectively. The lower flange portions 66 and 68 of the I-beams 58 and 60 are disposed generally parallel to the upper face of the load bed and are therefore normally horizontal. The I-beams 58 and 60 are preferably interconnected by three transverse bracing I-beams 70, 72 and 74, which extend across the front end, the middle and the rear end, respectively, of the wedge-shaped I-beams 58 and 60. Three strap plates 76, 78 and 80 are welded to the outer edges of the flange portions 62 and 66 of the I-beam 58 and to the webs of the respective transvere bracing I-beams 70, 72 and 74, and extend upwardly to a point above the lower flange 50 of the main I-beam 32. Three similar strap plates are connected to the outer edges of the flange portions 64 and 68 of the other wedge-shaped I-beam 60 and to the webs of the three transverse bracing I-beams. However, only the middle strap plate 82, which is disposed opposite the middle strap plate 78, is shown in FIG. 3. Thus it will be noted that each of the strap plates extends upwardly above the lower flanges 50 and 54 of the main longitudinal I-beams 32 and 34 and prevent the bogey wheel frame 56 from moving transversely of the load bed and disengaging the track means formed by the flanges 50 and 54. The upper ends of the several strap plates are either bent inwardly or provided with suitable dogs, such as the bars 87 (see FIG. 3a) which are welded to the inside faces of the strap plates 78 and 82, as illustrated in FIG. 3. The inwardly bent ends or dogs 87 of the several strap plates thereby provide a positive sliding connection between the bogey wheel frame 56 and the load bed 30, which will permit the bogey wheel frame to move relative to the track means formed by the flanges 50 and 54. A plurality of dual support or bogey wheels 84 and 86 may be connected to the bogey frame 56 by leaf springs 88 and 90, respectively, in the conventional manner, such as by suitable shackles 92, 94 and 96. A rear bumper 98 may be connected to the rear end of the bogey frame 56 by suitable I-beam structure 100 such that the bumper will move with the bogey wheel frame along the track means.

In summary, it will be noted that the bogey wheel frame 56 and bogey wheels 84 and 86 attached thereto are free to slide along the track means formed by the lower flanges 50 and 54, but are continually retained in the proper transverse position by the side straps and positively attached to the flanges 50 and 54 by the bent-over ends or dogs 87. However, the bogey frame 56 is retained in the rear position for normal road operations by an elongated bar 101 (see FIG. 2) which extends through the web of the I-beams 32 and 34 and which is so positioned as to contact the forward strap plate 76 and the corresponding forward strap plate (not shown) which is welded to the other wedge-shaped I-beam 60. When the bar 101 is removed, the bogey frame 56 can be made to move forwardly along the track means formed by the lower flanges 50 and 54 until the forward end of the bogey frame 56 contacts a pair of stops 102 which may be welded to the underside of the flanges 50 and 54 as illustrated in FIG. 2. The bogey frame 56 will then be in the forward position, which is the position of the bogey frame and wheels of the semitrailer 12 in FIG. 1, and in this position a second pair of apertures 104 (see FIG. 2) will then be aligned behind the rear strap plate 80 and the corresponding strap plate welded to the other I-beam 60. The bar 101 can then be inserted in the apertures 104 to secure the bogey frame 56 in the forward position so that the first semitrailer and tractor combination 10 can be loaded onto the second in accordance with the method of the present invention as hereafter described.

Figure 4:
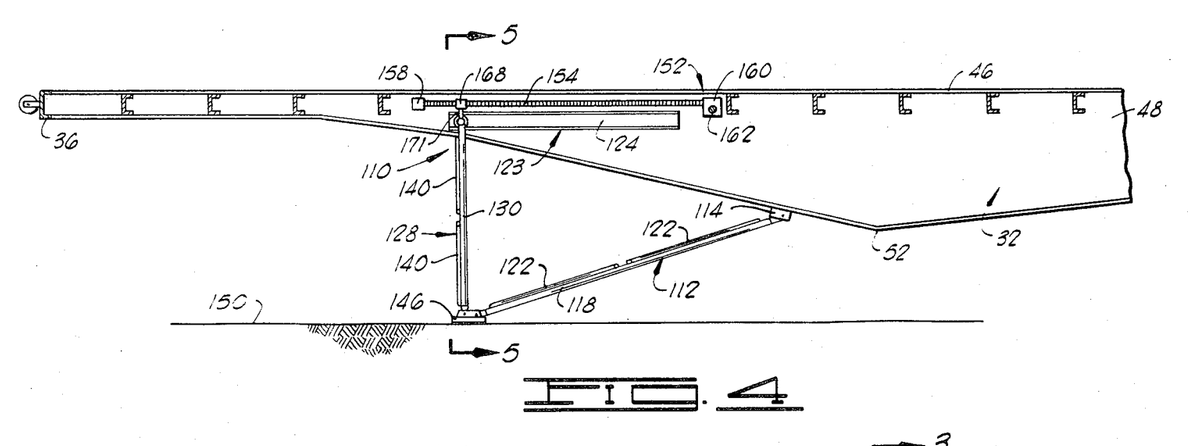
FIG. 4 is a longitudinal sectional view of the forward end of one of the semitrailers shown in FIG. 1, and illustrates a novel lift apparatus constructed in accordance with the present invention.
Figure 5:
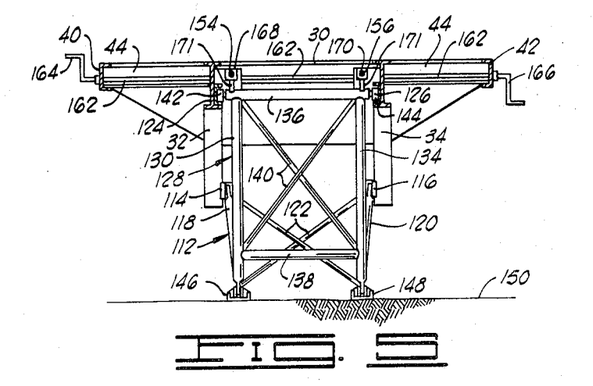
FIG. 5 is a sectional view taken substantially on lines 5—5 of FIG. 4.

Referring now to FIGS. 4 and 5, a novel lift apparatus for raising the forward end of the semitrailer bed is indicated generally by the reference numeral 110. The lift apparatus 110 comprises a first elongated frame member 112 which is pivotally connected to the underside of the semitrailer load bed by suitable brackets 114 and 116 which are welded to the underside of the lower flanges 50 and 54 of the I-beams 32 and 34, respectively. The elongated frame member 112 may be comprised of a pair of elongated tubular members 118 and 120 which are interconnected by crossbraces 122, as best seen in FIG. 5. A second elongated track means, indicated generally by the reference numeral 123, extends generally parallel to the upper surface of the load bed 30. The track means may conveniently be formed by a pair of facing channel beams 124 and 126 which are welded to the inner faces of the webs 48 and 49 of the I-beams 32 and 34, respectively.

A second elongated, upright frame member is indicated generally by the reference numeral 128 and may conveniently consist of a pair of upright tubular compression members 130 and 134 which are interconnected at the upper ends by a transverse upper member 136 and which are interconnected adjacent the lower ends by a transverse lower member 138. If desired, tension crossbraces 140 may be provided for lateral bracing.

A pair of rollers 142 and 144 are journaled on the opposite ends of the upper transverse member 136 and in the channels 124 and 126, respectively, so as to engage either the upper or lower flanges of the respective channels. The lower ends of the upright compression members 130 and 134 are pivotally connected to shoes 146 and 148, respectively, which engage the surface of the ground 150 when the lift apparatus 110 is in operation as hereafter described. The forward ends of the tubular members 118 and 120 of the first frame member 112 are also pivotally connected to the shoes 146 and 148, respectively. Thus it will be noted that the rear end of the frame member 112 is pivotally connected to the underside of the load bed 30 and the forward end is pivotally connected to the lower end of the upright frame member 128 by the shoes 146 and 148, while the lower end of the upright frame member 128 is pivotally connected to the shoes and the upper end moves along the second elongated track means formed by the channels 124 and 126.

The upper end of the frame member 128 is propelled forwardly and rearwardly along the second elongated track means by a drive mechanism, indicated generally by the reference numeral 152. The drive mechanism is comprised of a pair of elongated, threaded rods 154 and 156 which are disposed parallel to the channels 124 and 126. The threaded rod 154 is journaled on the web 48 of the I-beam 32 by a forward journal box 158 and a rear gear box 160. The threaded rod 156 is similarly journaled on the web 49 of the I-beam 34 by a forward journal box and a rear gear box (not shown). A transverse drive shaft 162 extends through the side channel 40, the web 48 of the I-beam 32, the gear box 160, the gear box (not illustrated) for the threaded rod 156, the web 49 of the I-beam 34, and the web of the other side channel 42. A pair of hand cranks 164 and 166 are provided at the outer ends of the transverse drive shaft 162 for rotating the drive shaft and consequently the threaded rods 154 and 156 by means of the respective gear boxes. It will be appreciated that the hand cranks 164 and 166 may be disconnected from the drive shaft 162 in such a manner as to leave no projections extending beyond the edge of the respective side channels 40 and 42. Nuts 168 and 170 are threaded onto the threaded rods 154 and 156, respectively, and are pivotally connected to the upper end of the frame member 128 by suitable means, such as the brackets 171 which may conveniently be connected to the transverse member 136.

From the above description of the lift apparatus 110, it will be evident that when the hand cranks 164 and 166 are rotated in such a manner as to move the nuts 168 and 170 forwardly along the threaded rods 154 and 156, the upper end of the second frame member 128 will also be moved forwardly along the track means 123 and the lower end of the frame member 128 will be lowered from the load bed 30 until the shoes 146 and 148 engage the ground 150. Then the forward end of the semitrailer 12 and the load bed 30 will be raised until the member 128 is vertical, as illustrated in FIG. 4, at which time the load bed will be generally horizontal. The length of the member 128 should be selected such that the forward end of the semitrailer 12 can be raised sufficiently high that the tractor 14 can be backed under the semitrailer to connect the semitrailer to the fifth wheel 18. As the lower end of the second frame member 128 is moved away from the load bed 30 and the load bed is raised, it will be evident that the first frame member 112 will be placed in tension.

When the hand cranks 164 and 166 are rotated in the other direction, the nuts 168 and 170 will be moved rearwardly along the threaded rods 154 and 155 and the upper end of the member 128 will also be moved rearwardly along the track means 123 formed by the channels 124 and 126. The first frame member 112 will then be placed in compression such that the lower end of the second frame member 128 will be maintained in approximately the same position longitudinally of the load bed, while the upper end of the second frame member 128 will be moved rearwardly along the track means 123. The shoes 146 and 148 will then be moved toward the load bed 30 and the forward end of the load bed will accordingly be lowered until it engages the ground.

It will be noted that by utilizing the threaded rods 154 and 156, the drive mechanism 152 will automatically be locked in any intermediate position, whether in the process of raising or lowering the load bed, without any exertion of force upon the hand cranks 164 and 166. Because of the high mechanical advantage of the drive mechanism the two drivers of the trucks can raise or lower the load bed even when fully loaded by the other semitrailer and tractor combination, as hereafter described, without danger of the hand cranks running away due to the weight of the load, nd thereby injuring the driver or damaging the vehicles. It will also be evident that an electric or fluid motor may be used to rotate the drive shaft, or the drive shaft and threaded rods may be replaced by hydraulic or pneumatic linear actuators for moving the upper end of the second frame member 128 along the track means 123. Further, it should be noted that the frame members 112 and 128 are so dimensioned as to be completely retractable between the I-beams 32 and 34 and not to interfere with normal operation of the semitrailer and tractor combination.

It will be appreciated by those skilled in the art that the semitrailer 12 heretofore described may be merely a flatbed or a so-called "stake bed" for transporting various large objects. However, it is an important aspect of the present invention to provide a semitrailer with peripheral side boards for hauling grain, gravel and other particulate material. Referring collectively to FIGS. 1, 6 and 7, a pair of side boards 180 and 181 and a pair of end gates 200 and 202 are pivotally connected along the respective lower edges to the load bed 30. When raised the side boards and end gates form a continuous fence around the periphery of the load bed in a conventional manner and when pivotally lowered assume the positions shown in FIGS. 1 and 7.

Figure 8:
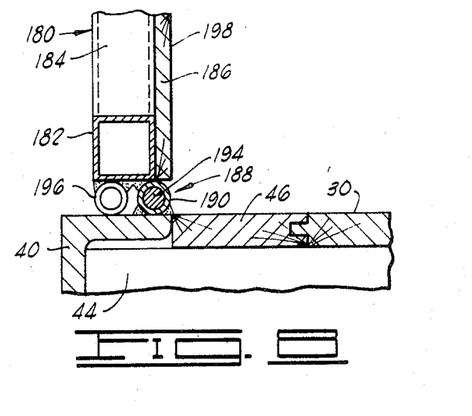
FIG. 8 is a transverse sectional view illustrating the details of the hinge structure pivotally interconnecting the side boards and the load bed of the semitrailers of FIG. 1; and, FIG. 9 is a sectional view taken on a horizontal plane through the corner of one of the semitrailers with the side boards and end gate up, and serves to illustrate the details of the hinge structure pivotally interconnecting the end gate and the load bed.

Referring now to FIG. 8, which is a transverse sectional view through one edge of the semitrailer 12 and the side board 180, which is raised to the position shown in FIG. 6, it will be noted that, as previously described, the wooden decking 46 which forms the upper face of the load bed 30 rests on the transverse channels 44 which are connected to the side channel 40. The side board 180 is comprised of a suitable frame fabricated from square tubular metal stock. The frame has a longitudinally extending member 182 and a number of upright members 184 fabricated from the square tubular stock. Plywood plating 186 is bolted to the frame members 182 and 184 to complete the side board. The lower edge of the side board 180 is pivotally connected to the upper flange of the side channel 40 of the load bed 30 by a hinge indicated generally by the reference numeral 188. The hinge 188 is preferably of the type known in the art as a "piano hinge" and is comprised of an outer tubular member 190 which is cut into a plurality of segments (not illustrated). Alternate segments are welded to the channel 40 and to the member 182. A long rod 194 is then passed through all of the segments of the outer tubular member 190 and functions as the hinge pin. A second tubular member 196 is preferably welded to the underside adjacent the outer edge of the longitudinally extending square tubular member 182, substantially as illustrated in FIG. 8, and serves as a spacer to arrest pivotal movement of the side board 180 when the side board is in the vertical position. It will be noted that the pivotal axis of the hinge 188 is so positioned relative to the inner face 198 of the side board 180 that when the side board 180 is pivoted into the horizontal position, the inner face 198 will rest flatly against the upper surface of the load bed 30 so that the other vehicle can be driven over the lowered side board, as hereafter described, without damage to the side board or the hinge.

Figure 9:
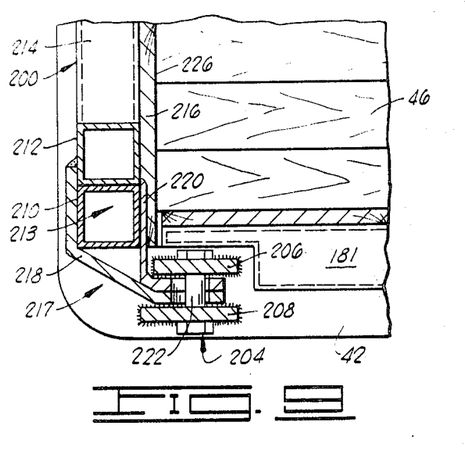

The rear end gate 200, which may be seen in FIGS. 1, 6, 7 and 9, and the front end gate 202, which can be seen only in FIG. 1, are pivotally connected to the load bed 30 by a pair of hinges, each of which is indicated generally by the reference numeral 204, as illustrated in detail in the horizontal sectional view of FIG. 9. Referring now to FIG. 9, it will be noted that the end gate 200 is constructed in the same manner as the side boards 180 and 181 from square tubular stock and plywood facing. Accordingly, two upright, square tubular members 210 and 212 form a corner post 213, while a horizontal member 214 forms the lower edge of the end gate 200. A plywood panel 216 is bolted to the inner surfaces of the square tubular members in any suitable manner to complete the end gate. A pair of upright plates 206 and 208 are welded to the upper flange of the side channel 42 and form a trunnion. A hinge strap 217 is comprised of an outer plate 218, which is welded to the outer face of the corner post 213, and an inner plate 220 which is welded to the inner surface of the corner post 213. The plates 218 and 220 are bent substantially as illustrated to mate and form the hinge strap 217 which then extends between the plates 206 and 208. A bolt 222 extends through suitable apertures in the trunnion plates 206 and 208 and in the hinge strap 217 and functions as a hinge pin.

It will be noted that the inner face 226 of the plywood panel 216 is offset from the center of the bolt 222 which serves as the pivot pin of the hinge 204 and the bolt 222 is also raised from the face of the load bed 30. Thus it will be noted that when the side boards 180 and 181 are pivoted from the vertical position into the horizontal position and lay flat on the load bed 30, the end gates 200 and 202 can then be pivoted into the horizontal position illustrated in FIGS. 1 and 7 and will overlie the side boards 180 and 181. In this connection, the total distance the inner face 226 is offset from the center of the pivot bolt 222 plus the distance the center of the pivot bolt 222 is above the face of the load bed 30 should equal the thickness of the side boards 180 and 181 such that the entire surface of the end gates will contact the side boards. Then when the semitrailer and tractor are driven over the folded down end gates and side boards, as hereafter described, the end gates 200 and 202 and the hinges 188 and 204 will not be damaged.

If desired, a plurality of ribs 230 having a triangular shape as illustrated in FIG. 6 may extend transversely of the load bed between the upper edges of the side boards 180 and 181 to brace the side boards in upright position and to provide a support for a tarpaulin or other protective covering in a conventional manner. When the ribs 230 are disconnected and the side boards and end gates folded down, the ribs 230 may be stored between the side boards 180 and 181 on the load bed 30 as illustrated in FIG. 7.

A track means 232 extending longitudinally of the tractor chassis and sloping upwardly from the rear of the tractor toward the front of the tractor is provided for slidably mounting the fifth wheel 18. The track means 232 may be similar in construction to the track means formed by the lower flanges 50 and 54, except upwardly facing. A frame 234, which may be constructed in the same manner as the bogey wheel frame 56, is slidably connected to the track means 232 in the same manner as the bogey frame 56 is connected to the track means formed by the flanges 50 and 54. The fifth wheel 18 is then pivotally connected to the frame 234 by a horizontal, transversely extending axle in the same manner that fifth wheels are conventionally connected to the chassis of a tractor. As the frame 234 and fifth wheel 18 are moved forwardly over the upwardly sloping track means 232, to shorten the wheel base of the vehicle in accordance with one aspect of the present invention, the fifth wheel 18 and consequently the forward end of the semitrailer 12 will be raised sufficiently to clear the rear end of the tractor 14. In some cases it may be unnecessary to utilize the moveable fifth wheel to shorten the wheel base of the vehicle, and in cases where the load bed is so designed to clear the rear of the tractor when the fifth wheel is moved forwardly, of course the track means 232 may be level. However, in extreme cases, both features may be necessary.

A plurality of cable winches 240 may conveniently be connected to the edges of the load bed 30 for securing the semitrailer and tractor combination 10 on the load bed of the semitrailer 26. A pair of the cable winches 240 are preferably connected at the front and rear ends of each of the load beds, as best seen in FIG. 7, and another pair of winches are preferably connected to the sides of each of the load beds 30 adjacent the forward ends thereof, as best seen in FIG. 1, for purposes hereafter described.

OPERATION

When using the semitrailer and tractor combinations 10 and 19 to haul grain or the like, the two vehicles will be loaded with the pay loads at one point and be driven to a destination by a pair of drivers. After unloading the cargo at the destination, the two drivers may then work together to prepare the vehicles for the return trip in accordance with the method of the present invention as follows. First the tarpaulin (not illustrated) and ribs 230 are removed from the side boards 180 and 181 of each truck. Next the side boards 180 and 181 are pivoted into horizontal positions such that the inner face 198 rests uniformly upon the upper face of the load bed 30. The end gates 200 and 202 are then pivoted into the horizontal position and rest upon the horizontally disposed side boards 180 and 181. The ribs 230 and tarpaulin for each semitrailer may then be placed on the respective load beds 30 between the side boards as illustrated in FIG. 7.

Next the lift apparatus 110 on the semitrailer 26 is lowered to the position shown in FIG. 4 so as to engage the ground and support the forward end of the semitrailer 26 so that the tractor 20 can then be driven from under the semitrailer. If necessary, the rear bogey wheels of the semitrailer 26 can be locked by air brakes in the conventional manner while the tractor 20 is moved from under the semitrailer. The forward end of the semitrailer 26 can then be lowered by operation of the hand cranks 164 and 166 until the forward end rests on the surface of the ground 150 to form an inclined ramp.

The wheel base of the semitrailer and tractor combination 10 is then reduced in the following manner. First the rear support or bogey wheels 84 and 86 are locked and the bar 101 is removed from the web of the I-beams 32 and 34 such that the bogey wheel frame 56 is free to slide forwardly along the track means formed by the flanges 50 and 54. The tractor 14 is then backed up until the semitrailer 12 is moved rearwardly over the bogey wheel frame 56 and bogey wheels 84 and 86 and the forward stops 102 engage the forward end of the bogey frame 56. Then the bar 101 is inserted in the apertures 104 to lock the bogey frame 56 in the forward position. As the tractor 14 is backed up and the bogey frame 56 moved forwardly, relative to the load bed 30, along the sloping track means formed by the flanges 50 and 54, the sloping track will raise the rear end of the semitrailer 12 relative to the bogey wheels 84 and 86 and therefore relative to the surface supporting the wheels.

If necessary, the fifth wheel 18 on the tractor 14 is moved from the rear position to the forward position as illustrated in FIG. 1. This can be accomplished merely by releasing whatever stops (not illustrated) secure the fifth wheel frame 234 in the rear position on the track means 232, and backing the tractor 14, with the bogey wheels 84 and 86 still locked, until the fifth wheel is in the forward position. As the fifth wheel 18 is moved forward, the forward end of the load bed 30 will be raised sufficiently that the center portions of the I-beams 32 and 34 will not contact the rear end of the tractor 14 as the vehicle is maneuvered as hereafter described. Even though the forward end of the load bed 30 is raised slightly by the inclined track means 232, due to the relatively great distance to the bogey wheels 84 and 86, the rear end of the load bed 30 will not be appreciably lowered.

After the bogey wheel frame 56 has been moved to the forward position on the inclined track means of the load bed, and the fifth wheel 18 has been moved to the forward position on the inclined track means 232, the overall wheel base of the semitrailer and tractor combination 10 will be appreciably less than the length of the load bed 30 of the semitrailer 26. It will be appreciated that on some vehicles it will be unnecessary to move the fifth wheel 18 forward to reduce the overall wheel base of the vehicle and accordingly the track means 232 may be eliminated.

Next the shortened semitrailer and tractor combination 10 is driven forwardly onto the semitrailer 26 such that the tractor 14 will be positioned at the rear end of the semitrailer 26, as illustrated in FIG. 1. The lift apparatus 110 is then actuated by rotation of the hand cranks 164 and 166 to raise the forward end of the semitrailer 26 sufficiently high that the tractor 20 may be backed under the forward end which is then connected to the fifth wheel 24. The raised rear end of the semitrailer 12 will extend over the cab of the tractor 20, substantially as illustrated in FIG. 1, and will permit complete maneuverability of the vehicle. The lift apparatus 110 may then be retracted so that the semitrailer 26 will be roadable. A series of chocks 242 may be placed on each side of the bogey wheels 84 and 86 of the semitrailer 12 and on each side of the wheels of the tractor 14. The cables 244 from the cable winches 240 located on each of the semitrailers are then connected to the other semitrailer and tightened to secure the semitrailer and tractor combination 10 in position. In this respect, it will be noted that the cables 244 from the winches 240 on the rear of the semitrailer 26 are connected to the front of the tractor 14, the cables 244 from the winches 240 at the front of the semitrailer 26 are connected to the bogey wheel frame 56 of the semitrailer 12, the cables 244 from the winches 240 along the sides of the semitrailer 26 extend upwardly and are connected to the semitrailer 12, and the cables 244 from the winches 240 along the sides of the semitrailer 12 extend downwardly and are connected to the semitrailer 26.

With the semitrailer and tractor combination 10 thus secured, the semitrailer and tractor combination 19 may then be driven back to the point of origin of the trip. In this connection, it will be appreciated that the two drivers working together can relatively quickly load one of the semitrailer vehicles on the other. Then the two drivers can start the return trip immediately, taking turns driving the tractor 20 and resting in the sleeper cab 22 which is illustrated.

Having thus described several preferred embodiments and subcombinations of the present invention, it is to be understood that various changes, substitutions and alterations can be made therein without departing from the spirit and scope of the present invention as defined by the appended claims.

What is claimed is:
1. In combination:
 first and second semi-trailers and tractors, each of the semi-trailers having an elongated load bed and support wheels adjacent the rear end of the load bed, each tractor having ground wheels, a fifth wheel for connection to the front end of the respective semi-trailer, and an operator's cab, and each semi-trailer and tractor having a wheel base defined by the distance between said support wheels and ground wheels;

an elongated track connected to the first tractor and extending longitudinally thereof, said elongated track having said fifth wheel slidably connected thereto for movement forwardly and rearwardly of the tractor whereby the wheel base of the first semi-trailer and tractor can be reduced to a length no greater than the length of the load bed of the second vehicle, said elongated track sloping upwardly whereby the forward end of the first semi-trailer will be raised when the fifth wheel is moved forwardly such that the underside of the first semi-trailer will clear the rear end of the first tractor; and means on one of the semi-trailers for raising the rear end of the load bed of the first semi-trailer when the first semi-trailer is positioned on the load bed of the second semi-trailer sufficiently high to clear the cab of the second tractor, whereby the first semi-trailer and tractor can be transported on the second semi-trailer and tractor.

2. In combination:

first and second semi-trailers and tractors, each of the semi-trailers having an elongated load bed and support wheels adjacent the rear end of the load bed, each tractor having ground wheels, a fifth wheel for connection to the front end of the respective semi-trailer and having an operator's cab, and each semi-trailer and tractor having a wheel base defined by the distance between said support wheels and ground wheels;

means for reducing the wheel base of the first semi-trailer and tractor to a length no greater than the length of the load bed of the second semi-trailer; and track means connected to the load bed of the first semi-trailer adjacent the rear end thereof, the track means extending longitudinally of the load bed and sloping downwardly from the load bed; and frame means connected to the support wheels and slidably connected to the track means and movable therealong to a point sufficiently forward to reduce the wheel base of the first semi-trailer and tractor combination to a length no greater than the length of the load bed of the second semi-trailer, whereby the downwardly sloping track means will raise the rear end of the first semi-trailer sufficiently high to clear the cab of the second tractor when the frame means is moved forward and the first semi-trailer and tractor combination is positioned on the load bed of the second semi-trailer and tractor combination for transport.

3. In combination:

first and second semi-trailers and tractors, each of the semi-trailers having an elongated load bed and having support wheels positioned under the rear portion of the elongated load bed located distally with respect to the respective tractor, each tractor having ground wheels, having a fifth wheel for connection to the front end of the respective semi-trailer, and having an operator's cab, and each semi-trailer and tractor having a wheel base defined by the distance between said support wheels and said ground wheels;

means for reducing the wheel base of the first semi-trailer and tractor to a length no greater than the length of the load bed of the second semi-trailer; and means on said first semi-trailer for moving the support wheels of said first semi-trailer downwardly relative to the load bed of said first semi-trailer whereby the rear end of the load bed of the first semi-trailer is elevated to a sufficient height to clear the cab of the second tractor and the first semi-trailer and tractor can be transported on the second semi-trailer and tractor.

4. The combination as defined in claim 3 wherein the second semitrailer is further characterized by:

lift means adjacent the forward end thereof for lowering the forward end of the load bed of the second semitrailer substantially to the ground and for raising the load bed from the lowered position to a position sufficiently high as to be coupled to the fifth wheel of the second tractor, whereby the second semitrailer can be lowered to form a ramp and the first semitrailer and tractor may be driven onto the load bed of the second semitrailer.

5. The combination as defined in claim 4 wherein the lift means is comprised of:

an elongated first member having front and rear ends, the rear end being pivotally connected to the underside of the second semitrailer and sloping downwardly and forwardly to the front end;

an elongated load bearing track connected to the underside of the second semitrailer and extending generally longitudinally thereof;

a second elongated member having upper end engaging the track and a lower end for engaging the ground, the lower end also being pivotally connected to the front end of the first elongated member; and, means for moving the upper end of the second elongated member along the track, whereby as the upper end of the second member is moved rearwardly along the track, the lower end of the second member will be moved toward the load bed to thereby lower the front end of the semi-trailer to the ground, and as the upper end is moved forwardly along the track, the lower end will be moved away from the load bed to thereby raise the front end of the semitrailer from the ground.

6. The combination as defined in claim 5 wherein the means for moving the upper end of the second elongated member along the track comprises:

an elongated, threaded rod journaled on the underside of the load bed and extending parallel to the track;

a nut threaded on the threaded rod and connected to the upper end of the second member; and, means for rotating the threaded rod in each direction.

7. In combination:

a first semi-trailer having an elongated load bed and having rear support wheels adjacent the rear end of said first semi-trailer;

a first tractor having a fifth wheel connected to the front end of said first semi-trailer, and having an operator's cab;

a second semi-trailer having an elongated load bed and having support wheels adjacent the rear end of the load bed thereof;

a second tractor having a fifth wheel connected to the front end of said second semi-trailer and having an operator's cab;

means for reducing the wheel base of the first semi-trailer and first tractor to a length no greater than the length of the load bed of the second vehicle by moving the first tractor rearwardly with respect to the load bed of the first semi-trailer, and moving the support wheels of the first semi-trailer forwardly with respect to its respective load bed; and means on the first semi-trailer for raising the rear end of the load bed of the first semi-trailer, when the first semi-trailer is positioned on the load bed of the second semi-trailer, to a height sufficient to clear the cab of the second tractor whereby the first semi-trailer and tractor can be loaded on the load bed of said second semi-trailer, and can be transported while so loaded.

8. In combination:

first and second semi-trailers and tractors, each of the semi-trailers having an elongated load bed and support wheels adjacent the rear end of the load bed, each tractor having ground wheels, a fifth wheel connected to the front end of the respective semi-trailer, and an operator's cab, and each semi-trailer and tractor having a wheel base defined by the distance between the ground wheels on the tractor and said support wheels;

means for reducing the wheel base of the first semi-trailer and tractor to a length no greater than the length of the load bed of the second semi-trailer;

means on the first semi-trailer for raising the rear end of the load bed of the first semi-trailer when the first semi-trailer is positioned on the load bed of the second semi-trailer sufficiently high to clear the cab of the second tractor whereby the first semi-trailer and tractor can be transported on the second semi-trailer and tractor;

a pair of side boards pivotally connected to the sides of the load bed of said second semi-trailer, said side boards being pivotal into a horizontal position to rest flat on the load bed; and a pair of vertically extending end boards pivotally connected to the rear end of the load bed and pivotable to a horizontal position resting flatly on the upper sides of the side boards whereby the side boards and end boards can be pivoted into the horizontal positions and the first semi-trailer and tractor can be driven over the end boards and onto the side boards in loading the first semi-trailer and tractor for transport on the second semi-trailer and tractor.

* * * * *